United States Patent [19]

Calhoun

[11] 3,778,617

[45] Dec. 11, 1973

[54] CONTAINER INSPECTION APPARATUS

[75] Inventor: Frederick L. Calhoun, Torrance, Calif.

[73] Assignee: A-T-O Inc., Cleveland, Ohio

[22] Filed: Feb. 12, 1970

[21] Appl. No.: 10,884

Related U.S. Application Data

[62] Division of Ser. No. 660,978, Aug. 16, 1967, Pat. No. 3,529,167.

[52] U.S. Cl. .............................. 250/223 B, 356/240

[51] Int. Cl. .............................................. H01j 39/12

[58] Field of Search ........................ 250/206, 219 DF, 250/223 B, 210; 356/240, 237, 239; 209/111.7

[56] References Cited

UNITED STATES PATENTS

| | | | |
|---|---|---|---|
| 3,123,715 | 3/1964 | Husome | 250/219 DF |
| 3,400,270 | 9/1968 | Durig | 250/206 |
| 3,081,666 | 3/1963 | Calhoun | 250/223 B |
| 3,292,785 | 12/1966 | Calhoun | 250/223 B |
| 3,415,370 | 12/1968 | Husome | 250/223 B |
| 3,328,590 | 6/1967 | Kapsambelis | 250/206 |

*Primary Examiner*—James W. Lawrence
*Assistant Examiner*—D. C. Nelms
*Attorney*—Smyth and Roston

[57] ABSTRACT

A container inspection device is disclosed wherein the bottom of a bottle is observed by an exchangeable lens system with a nutating, instantaneous object field of view. A reticle with opaque and transparent area of greatly differing size modulates the light from the object field and the modulated light is detected by a solar cell. The solar cell is a-c coupled to a detector circuit responding to a-c signals within a particular frequency range when exceeding a threshold. The threshold level is controlled through a circuit which is d-c coupled to the solar cell. Signals exceeding the threshold control separation of the bottle from others.

4 Claims, 8 Drawing Figures

INVENTOR:
Fredrick L. Calhoun
By Smyth, Roston & Pavitt
ATTORNEYS

INVENTOR:
Fredrick L. Calhoun

By Smyth, Roston & Pavitt
ATTORNEYS

INVENTOR:
Fredrick L. Calhoun

By Smyth, Roston & Pavitt
ATTORNEYS

INVENTOR
Fredrick L. Calhoun
By Smyth, Roston & Pavitt
ATTORNEYS

CONTAINER INSPECTION APPARATUS

This application is a division of Ser. No. 660,978, filed Aug. 16, 1967, now U.S. Pat. No. 3,529,167.

The present invention relates to improvements for container inspection devices. Recently, container inspection devices, particularly bottle inspection devices, have been suggested, described and built, which particularly detect dirt particles in the bottom of a bottle. The principle behind these devices is essentially the generation of a modulated radiation signal representative of a dirt particle in the container and the conversion of the radiation signal into an electrical signal for controlling the separation of dirty bottles from clean ones. The modulation results from a scanning field of observation or inspection, sweeping over the entire bottom of a bottle for complete inspection thereof, but only a portion of the bottom is inspected at any instant. The container is illuminated so that dirt particles can produce contrast, and as the inspection field sweeps over the bottom of the bottle, dirt particles, if any, modulate the illumination. The light from the instantaneous field of inspection is observed by light-sensitive means generating an electrical signal representative thereof. The light from the instantaneous inspection field is modulated, additionally, for example, by a rotating reticle having many opaque and transparent portions to obtain a modulation of the light by a dirt particle at frequencies in a range or band well above the fundamental for the sweeping by the instantaneous field. That frequency range is in particular defined by the rotating frequency of the reticle, plus and minus the sweep frequency, both values to be modified by a factor representing the reticle structure.

Successful operation of such devices has resulted in widespread adoption, whereby, however, specific problems arose and additional demands have been made. A central problem relates to the overall sensitivity of such an inspection device. On one hand, small dirt particles are to be detected while, on the other hand, bottles are not very accurately made items; the walls and bottoms are not uniformly made but rather uneven, the glass is not clear, there may be scratches, etc. As the inner bottom of a bottle is to be inspected as illuminated from the outside, any unevenness in the bottom operates as light modulation. Hence, light intensity variations due to causes other than dirt particles, may simulate signals of the type which are representative of dirt particles.

In general, the light intensity variations in the inspection field resulting from these unwanted, contrast producing sources will individually be small, and the a-c signals resulting from light chopping by the reticle will be low level noise. However, if there are several or even many such undesirable noise sources, and if the reticle has a large number of dark and clear areas, then the resulting modulation from several of these noise sources may at times be in phase, resulting in rather strong a-c noise signals. Elimination of this noise requires either desensitization of the system to an undesirable degree, or if that is not acceptable, error signals simulating dirt have to be expected.

This problem is supplemented and compounded to some extent by the requirement to operate the system at times for inspecting clear bottles, at other times for inspecting dark green or brown bottles. If the bottoms of such dark bottles are uneven, further modulation is introduced into the inspection signal which results in different amplitudes for signals representing dirt particles depending on the position of the dirt particles; when a dirt particle is on a thick bottom portion the drit-representing signal excursions will be less pronounced than when it is on a thin bottom portion. Bottles differ often in size; inspection of a bottle requires the optical system to be rather close to the often narrow mouth of the bottle in order to permit inspection of the relatively wide bottom. For differently high bottles this results in different optical conditions for the inspection, as the optical system cannot be maintained at a fixed distance from the bottom of the various types of differently high bottles.

The inspection device in accordance with the present invention solves these problems. The container, such as a bottle, when passing through an inspection zone of an inspection station is illuminated, and the illuminated bottom is observed through the mouth of the bottle. In particular, an optical unit is rotatably and removably positioned above the travel path of the bottles. The optical unit comprises a pair of imaging lenses and a pair of prisms mounted in between all four elements assembled to constitute a plug-in unit, to be inserted into a rotatable member such as a pulley. The optical plug-in unit can be exchanged for another one, having different optical properties, but the several units have preferably similar primary lenses. The primary lens is the front or object side lens facing the object field of view, i.e., the bottle. Variables for the several optical units are the focal length of the second, image side lens, its distance from the primary lens and the angle of deflections produced by the prisms.

The total inspection field is the bottom of the bottle and that field is in the inspection zone when the bottle has a position essentially coaxial with the optical axis of the second lens at the image side of the system which is also the axis of rotation of the pulley. The prisms define an optical axis at the object side of the system oblique to the axis of rotation so as to observe the bottle bottom in an off-center inspection field. The instantaneous field of inspection is defined by the aperture of a reticle onto which the two lenses image the bottom of the bottle. That aperture defines the image field of view for a particular object field of view which is the instantaneous inspection field having orientation in accordance with the properties of the imaging units. The prisms orient the instantaneous inspection or observation field of view eccentric to the image side axis of the system. As the optical unit rotates, the oblique optical object field axis nutates around the optical axis of the image side so that the instantaneous inspection field of view nutates likewise and sweeps around the nutation axis, thereby covering a large, total inspection field which should be at least as large as the bottom of the bottle.

The reticle is divided into essentially two areas or groups of areas. For example, a first area or a first group of areas, may be opaque, while the remaining area or areas constituting the predominant portion of the reticle is clear, i.e., transparent. For example, a more or less thin opaque line extends over part or all of a diameter of the round reticle disk, thus blocking radiation directed by the optical imaging system onto the reticle from further propagation. The opaque areas of the reticle as projected into the instantaneous inspection field define therein small areas of nonobservation.

The reticle rotates at high speed, preferably several times the speed of the optical unit so that the small area field or fields of instantaneous nonobservation travel across the instantaneous inspection field. The light intensity in the image area as seen through the rotating reticle will vary in accordance with dirt particles when sequentially in and out of the or an area field of nonobservation. The speed must be so high that the two small area field or fields of nonobservation cover the entire bottle bottom during one or a few nutations of the instantaneous field of view.

The smaller the area field of nonobservation, the less probable is simulation of dirt due to in-phase noise generating conditions. Thus, the ratio of the area field or fields of nonobservation to the area or areas of observation, i.e., the size of the opaque portion or portions of the reticle to the remainder of the reticle should be very small such as 1:10 or even smaller. The ratio is not critical, but the smaller it is (below unity) the less probable are noise signals. However, the smaller that ratio, the higher must be the speed ratio between reticle and prism rotation to obtain full coverage of the entire bottle bottom.

Alternatively, the small area or areas on the reticle may be clear, while the remaining area which then is essentially the entire reticle aperture, is opaque. This is merely the complementary situation, the area ratio then being considerably larger than unity. Essential is a large dissimilarity in between the total size of the opaque area or areas and the total size of the clear area or areas of the reticle.

The image of the inspection field in the reticle plane is observed by a photo detector, preferably a solar cell, through a condenser lens which is closely positioned to the reticle. The photo detector is positioned in relation to the condenser lens, so that the aperture of the imaging unit is imaged by the condenser lens into the photo detector. The output of the photo detector is an electrical signal representing the light intensity in the instantaneous inspection field as seen through the reticle. This electrical signal will have an average amplitude which depends primarily on the intensity of the light source, the aperture from the imaging system and the absorption of the bottle bottom. The electrical signal has a variable component which includes relatively small variations of the amplitude relative to the average value thereof and representing the modulation due to various factors, including the relative motion between an area of nonobservation and a dirt particle.

The electrical signal is processed twofold. The first circuit used here is the particle detector circuit proper. The variable component of the photo detector signal is separated by a-c coupling, and through selective filtering signals in a particular band are separated from the remaining signal components. The center of that band is defined by the reticle rotation times a factor which is determined by the angle ratio of one area of noninspection (or the complement as the case may be) over a full circle. The band width is determined by the nutation frequency as modified by the same factor. Signals having frequency above the band may, but do not have to, be suppressed as they do not represent additional noise but harmonics of the signals representing dirt particles. Frequencies below the band should be excluded as they represent primarily variations in the optical properties of the bottles. A-c signals having passed the selective filtering are also amplified. Provided these signals exceed a threshold level, they are then recognized as representing dirt particles.

The photo detector output is processed as d-c signal in a second circuit for controlling the relationship between the filtered a-c signal and the threshold level. That d-c signal represents the intensity of the radiation from the instantaneous field of observation or inspection, preferably in linear relation thereto. The d-c signal is used preferably to control the threshold level of the detector circuit. Alternatively, the d-c signal can be used to control the gain of the a-c amplifier. It was found, however, that nonlinear compensation would be required and control of the detector threshold is thus preferred. One can use separate photo detectors for the generation of the a-c and of the d-c signals, but this is not necessary.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawing, in which:

Figure 1:
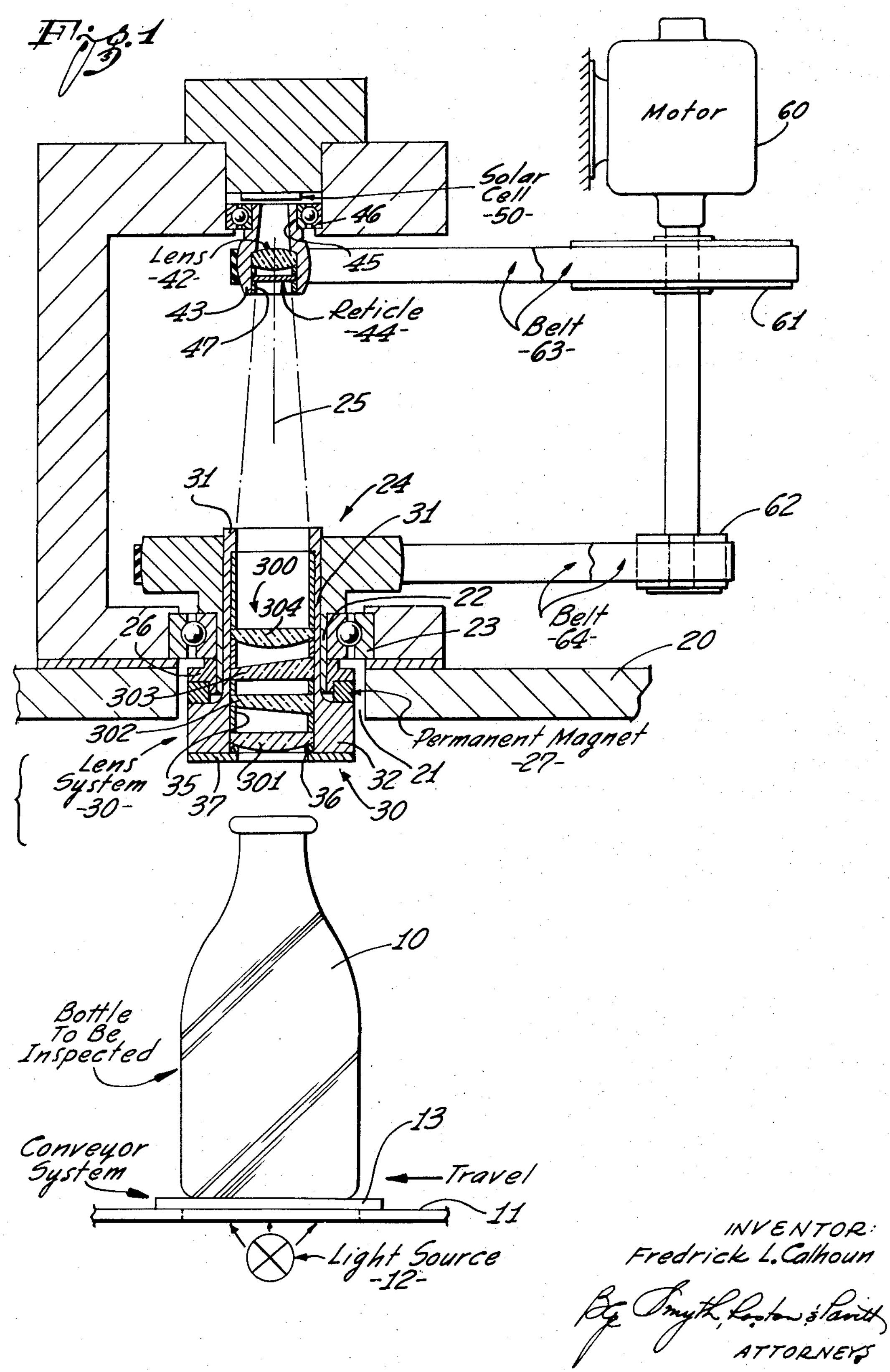
FIG. 1 illustrates an elevation, partially as cross-sectional view of and into an inspection station in accordance with the preferred embodiment of the invention.
Figures 2, 2A, 2B:
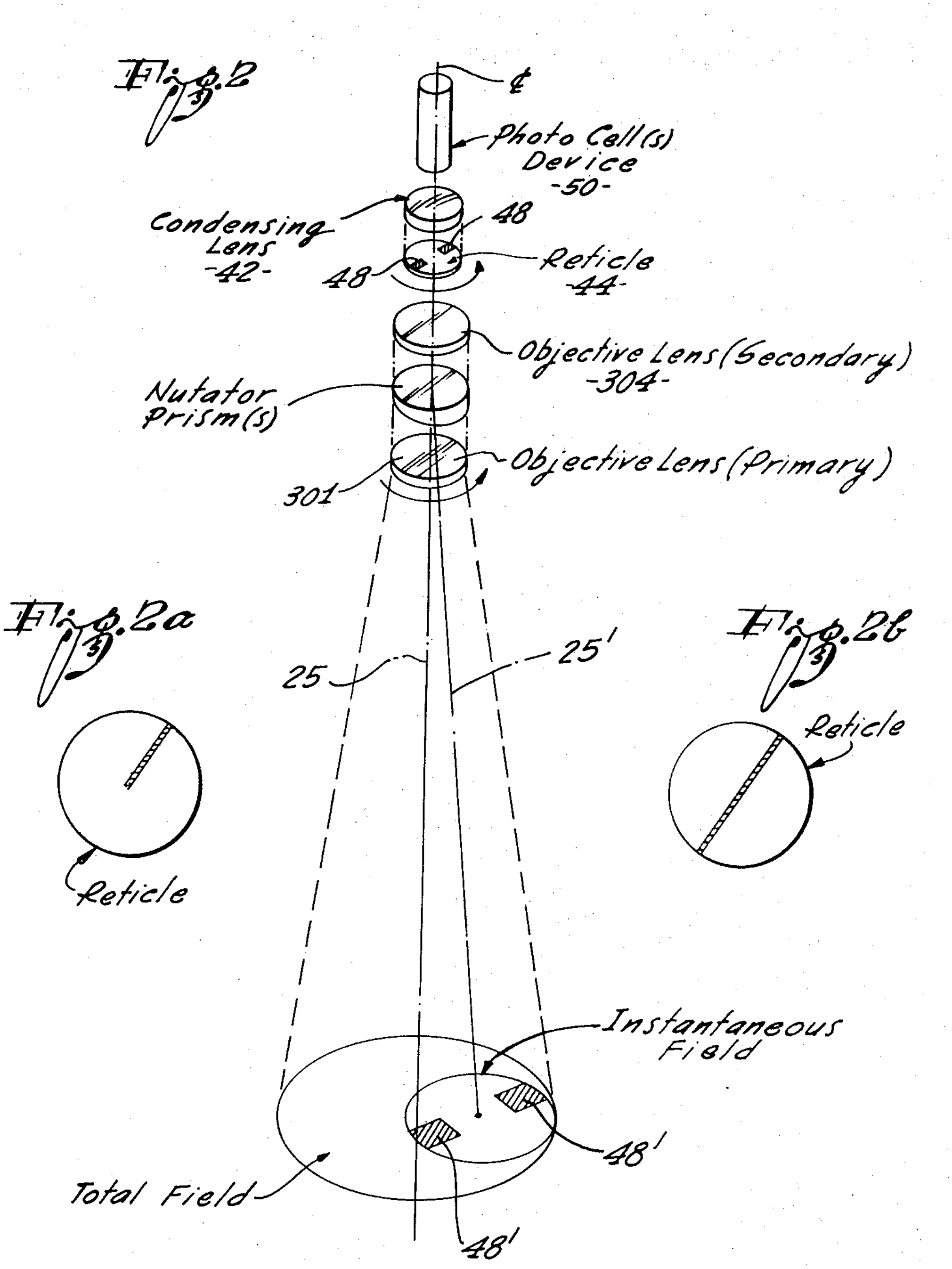
FIG. 2 illustrates in perspective view the layout of the optical system in the station shown in FIG. 1.
Figures 2C, 2D, 4:
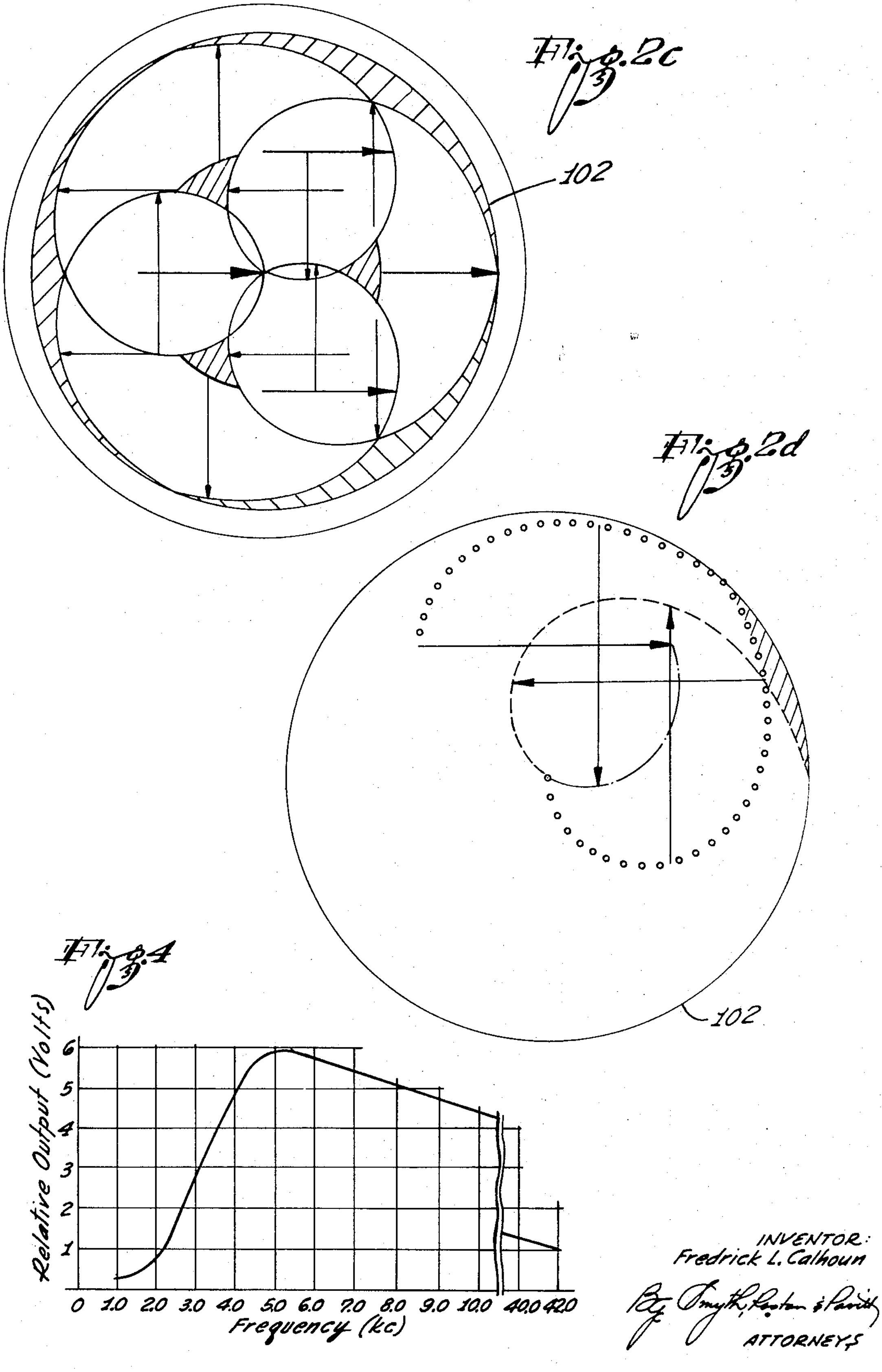
Figure 3:
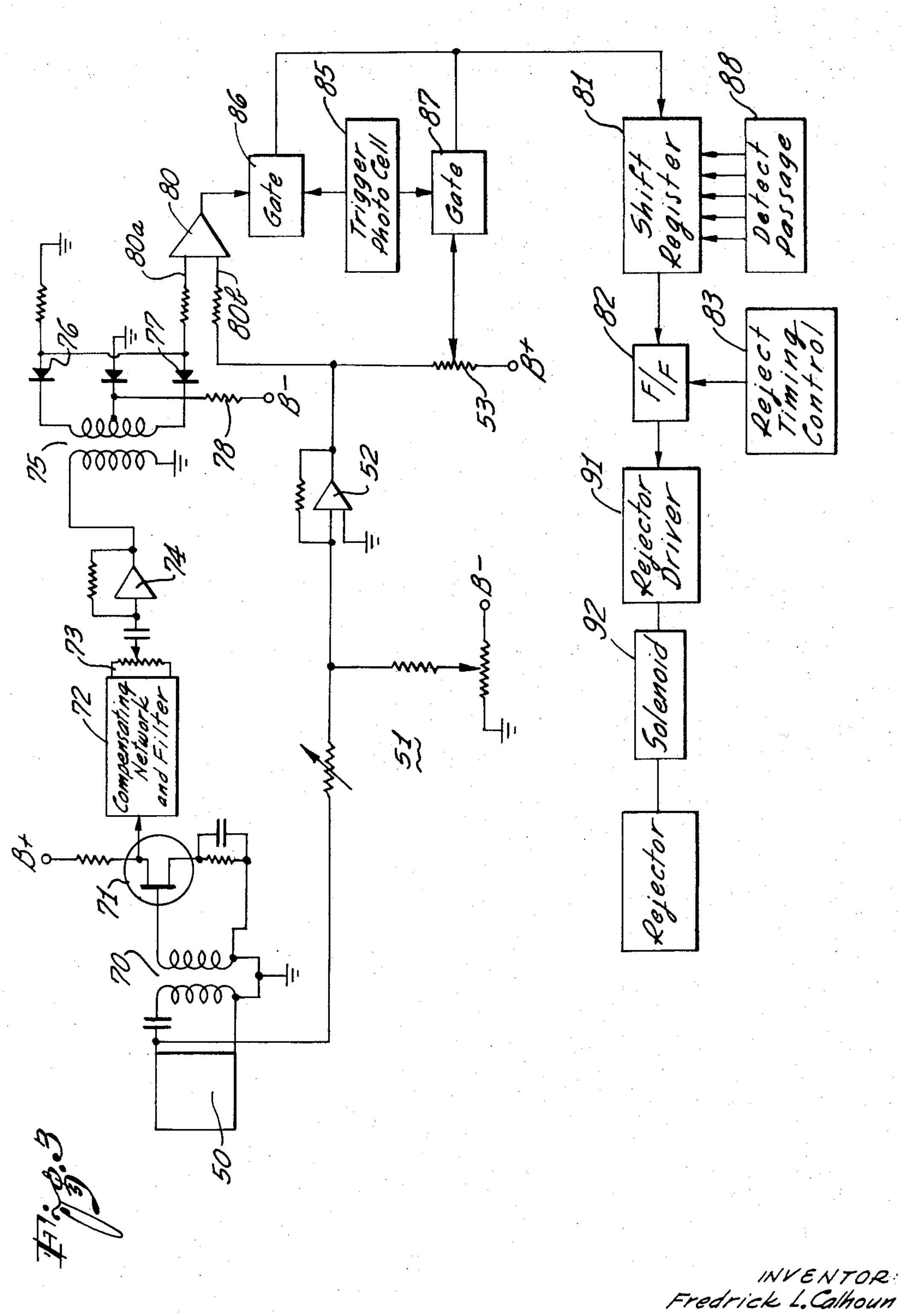

FIGS. 2*a* and 2*b* illustrate several reticle patterns which can be used in the station shown in FIG. 1;

FIGS. 2*c* and 2*d* illustrate total inspection field coverages of reticles shown in FIG. 2*d* and 2*b* for a particular reticle speed, nutation ratio;

FIG. 3 is a circuit diagram for the circuit processing signal developed in the station shown in FIG. 1 and includes a block diagram for circuit and other elements for using the electrical output of the inspection station; and FIG. 4 is a response characteristics of the freqency selective circuit in the circuit shown in FIG. 3.

Proceeding now to the detailed description of the drawings, in FIG. 1 thereof, there is illustrated somewhat schematically the layout of an inspection station in accordance with the preferred embodiment of the present invention. Containers 10 such as bottles are transported on a conveyor belt 11 past the inspection station. The container 10 is presumed to be transparent to some extent, i.e., its wall, and most particularly its bottom, is not completely opaque. Within this rule, however, the range of permissible transparency can vary widely. For example, the bottle 10 may be a clear glass bottle but it can also be a dark brown or green bottle such as commonly used for bottled beer or other beverages.

The specific construction of the conveyor belt 11 is not important. However, the conveyor belt 11 must be provided with windows 13 or other types of transparent sections permitting passage of light from a stationary light source 12, positioned underneath conveyor 11; light source 12 thus illuminates a bottle 10 when on such a window 13 from below. In particular the bottom of a bottle is illuminated when passing through the range of lamp 12.

The lamp 12 is positioned essentially in optical alignment with an optical system in the portion of the inspection station disposed above conveyor 11 and described in greater detail in the following. The inspection station proper is comprised of a basic support element or housing 20 suitably mounted above conveyor 11. The housing 20 may be raised or lowered to accomodate differently high bottles. The bottom plate of housing 20 has an opening 21, and a bearing 22 is positioned in the housing in alignment with opening 21. A tubular extension 23 of a pulley 24 is mounted to and received by the bearing 22 for rotation about an axis 25. A support ring 26 is mounted around the lower end of the tubular sleeve 23 and a ring-shaped permanent magnet 27 is mounted on ring 26.

The pulley 24 with sleeve 23 receives a tube 31 pertaining to a thimble insert 30. The thimble has a main ring-shaped, magnetizable flange 32 with a cylindrical bore from which extends the tube 31 coaxially therewith. Tube 31 and sleeve 23 should provide a rather tight fit, but do not have to provide for frictional engagement, rather the tube 31 should be easily removable from the sleeve 23. The upper, annularly shaped shoulder of flange 32 is magnetically attracted and engaged by the ring magnet 27. Magnet 27 couples thimble 30 to pulley 24 for following the rotation thereof.

The tubular interior of the thimble 30 receives an optical system 300 which comprises a primary objective lens 301 a first prism 302, a second prism 303 and a secondary lens 304, all in optical alignment. The optical axes of the lenses coincide with each other and with the axis of rotation 25 of pulley 24. A plurality of spacers 35 determines the relative position of the optical elements 301 to 304 relative to each other along axis 25. An "O" ring 36 together with a hold-down cap 37 positions the primary lens 301 in a position to face the opening of a bottle when underneath the station. Primary lens 301 defines a plane which can be regarded as a fixed parameter of the inspection station and particularly in relation to housing 20 and to other elements therein. That plane defines, so to speak, the optical entrance plane for the inspection system having a definite position to the upper end of a bottle.

The other optical elements, 302, 303 and 304 have a position relative to lens 301 which depends on the type of bottle to be inspected; particularly the height of the bottle and the diameter of the bottom thereof are controlling factors. Different thimbles will have different secondary lenses 302, and/or the secondary lenses will have different positions from the primary lens as provided by suitable spacers 35. The prisms 302 and 303 are preferably similar and provide a deflected optical axis 25' of the system at the optical entrance or object side thereof. The object field of view is thus not symmetrical relative to axis 25, for an image field that is symmetrical to axis 25. The relation between the axes 25 and 25' is seen best in FIG. 2.

The angle of deflection of the optical axis, i.e., the angle between the axis of the image field (axis 25) and the axis of the object field (25'), depends on the azimuthal relation between the two prisms 302 and 303. Each prism provides a particular deflection angle $\alpha$; when in a complementary position the deflection angles cancel and the resulting deflection is zero. When in a symmetrical position related to a center plane between them, the deflections as provided by each of them add, providing maximum deflection angle $2\alpha$ between the axes 25 and 25' and as obtainable with these two prisms. Any in-between azimuthal position of prisms 302 and 303 relative to each other produces a deflection angle smaller than the maximum angle but larger than zero. A suitable fine adjustment can be performed here by rotating primary lens 301 and prism 302 together with the spacer in between about axis 25, while leaving prism 303 in position.

Upon insertion of thimble 30 with optical elements 300 into pulley 24 and sleeve 23, the optical system 300 is rotatably positioned and mounted to housing 20 for following the rotation of pulley 24. As the axis of rotation coincides with optical axis 25, the deflected axis 25' will nutate around axis 25.

Another optical system 40 is positioned in housing 20 and in optical alignment with optical axis 25. A yoke structure 41 provides for suitable mounting. This optical system 40 comprises a condenser lens 42 mounted in the interior of a pulley 43. A reticle 44 is mounted to pulley 43 in between spacers 47 and 48 and in optical alignment with and close to condenser lens 42. The pulley 43 has a tubular extension 45 journaled in yoke 41 by means of a bearing 46. The pulley 43 is thus rotatably mounted to the yoke and its axis of rotation again coincides with the optical axis 25 which is also the optical axis of condenser lens 42, as well as the axis of rotation of pulley 24.

Lens system 301–304 images the bottom of a bottle into the plane of the reticle. Different lens systems in different thimbles accomodate different bottles as far as height, as well as bottle bottom diameter is concerned to obtain always this particular imaging requirement. The usable image field is restricted by the optical aperture of reticle 44 which is the interior diameter of the spacer 47 holding reticle 44 in place. Optical system 300 images an object field into that image field, which (for small angles between axes 25, 25') is a cone around axis 25' resulting in a circular inspection field of view in the bottom of a bottle around a center where axis 25' traverses that bottom. This inspection field is eccentric to axis 25. During rotation of the system 300, particularly of the prisms, that inspection field of view nutates around axis 25, thereby covering a total field which is larger than the instantaneous field of view and should cover the bottom of a bottle. The relationship between nutating field 101 and total field 102 is depicted in FIG. 2.

Condenser lens 42 as closely positioned to reticle 44 observes the image plane and provides the radiation as a more or less diffuse radiation field onto a solar cell 50, to obtain a more or less even illumination density for the cell 50. The lens 42 has a small focal length. The entrance plane of solar cell 50 is in the image plane of lens 42 for (hypothetical) objects in the plane of the primary lens 301. Thus, the condenser lens 42 observes the aperture of the system 300, particularly of the primary lens 301, so that the image of that aperture defines the area on cell 50 which is being illuminated.

As stated, the aperture of reticle 44 defines the object field of view in the bottle bottom as imaged onto the reticle. Due to close position of reticle 44 to lens 42 radiation composing the image of the inspection field is diffused by condenser lens 42 over the area of cell 50 within the imaged aperture of the primary lens. Different thimbles 30, i.e., different lens systems 301–304 merely adapt the entire system to differently high and/or wide bottles so that the resulting instantaneous object and inspection field of view 101 differ particularly with regard to size and eccentricity. However, the object fields of view are always imaged onto the reticle and the condenser lens 42 projects always the same aperture onto cell 50 because the aperture of the system 300 remains always the same.

Representatively, the primary lens 301 may have a focal length of 9.5 inches for all units and each of the prisms 302 and 303 may produce a deflection of 2.5°. The following other values can then be used with advantage. A 12 ounce export beer bottle may require a total inspection field (see 102, FIG. 2, infra) of a radius 1.125 inches. A secondary lens of 2.0 inches focal length will then be positioned at a distance 0.21 inch from the primary lens and the prisms 302 and 303 will be adjusted to produce a deflection angle of 3.0°. The head of the inspection station will be adjusted so that primary lens 301 is 9.75 inches from the bottom of a bottle on the conveyor.

For a larger, quart size bottle, a total inspection field having radius 1.687 inches will be required and the head of the inspection station will be positioned so that lens 301 is 10.25 inches from the bottom of such bottles. A deflection angle of 3.7° and a secondary lens of 1.25 inches focal length at a distance of 0.90 inch from the primary lens will produce suitable results. Other types of bottles will require different values, bottle height and bottom diameter being the controlling factors.

A motor 60 drives a first pulley 61 of relatively large diameter as well as a second pulley 62 of relatively small diameter. The pulley 43 is rotatably coupled to pulley 61 through a belt 63 to obtain a relative high rate of rotation of reticle 44. The larger pulley 24 is rotatably coupled to the small motor driven pulley 62 by means of a belt 64 to obtain a relatively slow rotational speed. The ratio between speed of rotation of pulley 43 to speed of rotation of pulley 24 may be 3, 4 or 5:1. Representatively, the reticle may rotate at 48,000 rpm (=800 cps) the optic 300 may rotate (for nutation of the instantaneous field of view) at 12,000 rpm (=200 cps). The speed ratio is greatly dependent upon the configuration of the reticle. The result of the optical layout together with the effect of rotation imparted on the various optical elements is explained best with reference to FIG. 2.

The instantaneous field of view 101 is the reticle aperture as projected by lenses 301–304 onto the bottom of a bottle. The reticle 44 is, for example, defined by an essentially transparent disk with two short, opaque lines 48, each extending radially inwardly from the periphery of the reticle and along a diameter thereof. Thus, within the instantaneous field of view 101 there are two area fields 48' which can be regarded as area fields of nonobservation. The remaining portion of field 101 is observed at that instant. The image of these areas 48' as projected onto the two opaque lines 48 of the reticle is thus not seen by the photocell 50. As reticle 44 rotates, the area fields of nonobservation 48' rotate likewise so that the nonobservation of any area in field 101 is only temporary, the entire field 101 will actually be observed. A dirt particle in the instantaneous field of view 101 but outside of the area fields 48' of nonobservation produces a certain reduction of the light reaching cell 50. If, pursuant to rotation of the reticle, that dirt particle is in an area field 48', then the light from the field of observation reaching cell 50 is not reduced any more by the dirt particle and will actually increase.

During rotation of the reticle, the area field 48' of nonobservation sweep a certain annular field having width equal to the radial length of the area fields 48'. A dirt particle in the ring area will thus produce a temporary increase in the light reaching cell 50 as one or the other of the are fields 48' pass over it. If the average angular width of each field 48' is 1/n of a full circle, if the rotational speed of the reticle is U and if it is assumed that the field 101 does not nutate, then field 48' covers a dirt particle during each revolution for a period of time equal to 1/U n. As field 101 nutates the period is larger (shorter) when the direction of motion of a field 48' due to reticle rotation is opposite or the same as the direction of nutation. If the nutation speed is V, then the period of time a dirt particle may be covered by an area of temporary nonobservation is between $1/(U+V)n$ and $1/(U-V)n$.

By operation of the rotation imparted upon the pulley 24 the prisms 302 and 303 rotate, thus causing the instantaneous field of view 101 to nutate about the axis 25, and to sweep over the total field of observation and inspection 102. The combination of reticle rotation and field nutation results in a particular sweep path of either area field 48' of temporary nonobservation which depends greatly on the relation between nutational and rotational speeds. The objective is to have each point in the total field 102 of observation swept over at least once by at least one of the area fields of temporary nonobservation. Since a-c techniques are employed to detect the presence of dirt particles, background noise is greatly reduced if the total area field of nonobservation is small and if they are few in number. This requires a relative high ratio of rotation to nutation speeds, which in turn narrows the band width of meaningful signals.

The rotational speed could be selected so that it is not an integral multiple of the nutation speed, and if the time of observation permits more than one full nutation cycle for observation, then dead spots, i.e., portions in the total inspection field not swept over by at least one area field of temporary nonobservation during any nutation cycle will be swept over during another one. This permits again relative low speed ratios. However, if the system is designed to guarantee full coverage during one nutation cycle, then the rotation, nutation speed ratio must be rather large. In any event, that ratio will be the larger the smaller the area field of nonobservation.

The considerations above hold true if the reticle is essentially opaque and areas 48 are small transparent areas. Then the corresponding small area fields 48' are ones of temporary observation, the remaining portion of field 101 being not observed temporarily. Full observation of the entire inspection field will result also by the combined effects of reticle rotation and field nutation. Essential is considerable dissimilarity in area coverage of opaque and transparent portions of the reticle.

A single spoke-reticle, such as shown in FIG. **2*a* produces a rectangular area of temporary nonobservation having length equal to a full radius of the instantaneous field of observation. Such a reticle will leave certain areas in the total field uncovered if the speed ratio is 4:1. The coverage of a total field 102 by a single spoke reticle is shown in FIG. 2*c*, the arrow representing various positions of the spoke defining the temporary area field of nonobservation. The hatched areas will not be swept over by that area field of temporary nonobservation, so that particles in these hatched areas will not modulate the light by interaction with the single spoke area field of temporary nonobservation. The peripheral areas are not critical as one can select the field 102 larger than the bottom of a bottle, but the hatched areas in the interior of field 102** cannot be tolerated. An increase of the reticle speed, for example, to the ratio of 5:1 eliminates the internal uninspected areas.

A double spoke reticle, as shown in FIG. 2*b*, produces a field coverage for the same speed ratio 4:1 as shown in FIG. 2*d* (hatched field). The circle line describes the path of one end of the double spoke type area field of temporary nonobservation during one revolution of the reticle, the dashed line describes th path at the other end. There are not hatched areas in the interior of field 102, only small peripheral areas show some omission in the coverage. Again, upon selecting the total inspection field larger than the bottom of a bottle, the entire bottom can, in fact, be covered. Allowing several nutation cycles for field coverage permits even further reduction in the speed ratio, if the reticle speed is not an integral multiple of the nutator speed.

It should be noted that for the double spoke-reticle shown in FIG. 2b the ring-shaped area of the total field along the path of the axis 25', i.e., of the center of the instantaneous field 101, is swept over by the central portion of the spoke as well as by outer positions thereof during different phases, so that the central portion can be omitted, resulting in the particular configuration of the reticle shown in FIG. 2. Upon increasing the speed ratio to 5:1 the opaque areas 48 can be made shorter and/or one of the opaque areas 48 can even be omitted, and still full coverage is obtained.

In general, as was mentioned above, a dirt particle of relatively small size will produce an excursion in the light intensity as received by cell 50 corresponding to an increase of the intensity for a period in the range $(U+V)/2n$ to $(U-V)/2n$. If the reticle is essentially opaque with one or a few small transparent areas, the light will temporarily decrease for such a period. In either case such excursion represents a half wave of a signal having frequency in the range $(U+V)n/2$ to $(U-V)n/2$. The cell 50 then produces an electrical signal representative of the average radiation intensity as received by cell 50 during a nutation cycle, upon which three components are superimposed. First, variations in the average field intensity of the instantaneous field of view during a nutation cycle having frequency V; second, excursions due to dirt particles resulting in signals having frequencies in that range; third, noise.

The processing of the output signal of cell 50 requires separation and exclusion of the average intensity value, as well as of the first and third superimposed components to obtain the second component. Hence, dirt particles can be detected by providing means responding to light intensity variations having frequency in the range $(U-V)/2n$ to $(U+V)/2n$. Response of the means to higher frequencies is not necessary but is detrimental as little noise will occur in higher frequency ranges. Response to lower frequency should be inhibited to eliminate the effect of the nutation. High rotational speeds and narrow spoke-reticles are instrumental in facilitating the reduction or even exclusion of noise frequencies and of the nutation modulation due to unevennesses of the bottle bottoms, etc.

Proceeding now to a description of FIG. 3 there is illustrated the processing device for the signals obtained in the photo electric detector 50. The solar cell 50 is coupled directly through a transformer 70 to the control electrode of a field effect transistor 71. The field effect transistor is used primarily because of its high gain and high input, low output impedances and low noise characteristics. The output signal of the field effect transistor 71 is fed to a compensating network 72 which includes filter elements and an adjustable output resistor 73. The resistor 73 is always in full in the compensation circuit 72 but the tap or glider serves to provide adjustment in the output level. The potentiometer 73 actually sets the slope of the output signal as a function of light intensity.

The output of the circuits 72, 73 is a-c coupled to an operational amplifier 74 having RC stages to obtain the necessary gain in the system. Both high and low frequency roll off is accomplished, and for each stage there is obtained the necessary frequency response to obtain the total frequency characteristics as shown in FIG. 4. This figure illustrates particularly the frequency response of the circuit as between input of transformer 70 and output of amplifier 74, to accomodate particularly a signal band of 4.8 kc to 8 kc, derived as follows: let the nutator speed be 12,000 rpm (−200 cps), the reticle speed may be 48,000 rpm (=800 cps), then for a reticle with $n$=16($n$/2=8), the frequency range will be 8 (800±200) cps. One can see that d-c and lower frequency components are essentially eliminated, particularly signals of nutator frequency. The high frequency roll off is not very pronounced as this is not necessary.

The output of the amplifier 74 is coupled to the primary winding of a transformer 75. The secondary winding of transformer 75 is center tapped and two rectifier diodes 76 and 77 are coupled to the terminal ends of the secondary winding to form a full wave rectifier. The center tap is biased by means of an adjustable resistor 78 connected between $B^-$ and ground through another diode. The adjustment position of resistor 78 establishes the operating level of the output circuit of the rectifier. The a-c pulses, after rectification, are superimposed upon the bias level, and the combined output as developed at the interconnected cathodes of the two diodes 76 and 77 is fed to one side, 80*a*, of a differential amplifier 80. The other input 80*b* of amplifier 80 receives a reference signal controlling the response level of this detector circuit. The output of amplifier 80 may be positive if the rectifier output exceeds the reference signal and negative in the reverse case. Hence, the reference signal determines the threshold of response by amplifier 80 to rectified signals for producing positive output signals. These positive output signals of amplifier 80 are then regarded as representing a dirt particle or particles, negative outputs of amplifier 80 represent noise. Amplifier 80 is thus the output element of the dirt particle detector. The reference signal at input 80*b* determines the threshold separating noise from detection signals.

If the bottles inspected were rather uniform, such as that they were all clear, or all dark green, brown, etc., then the reference signal input 80*b* of amplifier 80 could receive a particular input defining the threshold of the system. However, the same station may at different times monitor differently colored bottles ranging from clear to very dark brown or green. If the bottles of the same type (color) were all uniform as far as bottom thickness and color distribution is concerned, then a simple potentiometer adjustment for the reference input at 80*b*, readjusted when the type of bottles changes would suffice. However, it has to be observed that the bottle bottoms are not very uniform but they do have thickness variations which are effective in an uneven illumination of the total observation field. The instantaneous field of view is smaller than the total field to be scanned, so that the average light will differ during one nutation cycle and will vary in accordance with the nutation frequency. The resulting low freqency signal is, of course, rejected by the a-c system between cell 50 and rectifiers 76, 77. However, the amplitude of a signal representing a dirt particle will be smaller if the dirt particle is on a thick bottom portion than if it were on a thin bottom portion. This means that a system without a gain or threshold control operates at different sensitivities. Unevenness of the thickness of the bottom of bottles requires sensitivity tracking faithfully following the signal level at least for the nutation cycle. The threshold level of detector response should be adjusted in accordance with the average light intensity of the instantaneous observation field. It follows, therefore, that the automatic threshold control or ATC for short, must respond to the light intensity of the instantaneous field of view 101.

The ATC system uses the d-c value of the photo detector 50. The d-c output of cell 50 is passed through a resistor network 51 to adjust the operating level for the signal to be processed in an operational amplifier 52, to obtain an essentially linear signal in dependence upon light intensity. The output signal of amplifier 52 controls the input 80b of differential amplifier 80 to set the threshold level for the dirt particle detection in linear dependence upon the light intensity in the instantaneous field of view.

It should be noted, that the a-c component of the output signal of the cell 50 is considerably smaller than the d-c component. The a-c detector circuit elements 70 to 80 suffice to separate the a-c from the d-c due to the particular response characteristics as shown in FIG. 4. The ATC system responds to the d-c signal, which still may include the a-c component but this a-c component in the ATC control circuit has a considerably lower db level than the output excursion produced concurrently by amplifier 74. Thus, the ATC will not operate in amplifier 74 for suppression of signals representing dirt particles.

An adjustable resistor 53 permits employment of the d-c output signal of amplifier 52 for the detection of a more or less uniformly dirty bottle, resulting from a dirt film on the bottom. Such film may not produce sharp enough signal excursion to be detected as a-c signal. The tap 53' of resistor 53 is an alternative detector output supplementing the dirt particle detector as aforedescribed.

Proceeding now to the description of the remainder of the system, as the bottles on the belt 11 pass through the inspection station they are only for a very short period of time in the inspection zone. This means that the bottom of a bottle can be observed, unobscured by the rim thereof for a short period of time only. That period of time depends on the speed of conveyor 11, the relative size of the rim of the bottle and the closeness of lens 301 to the rim. The period of obsrvation must at least last through one nutation cycle, which for a 200 cps nutation is 5 milliseconds. As the conveyor speed is usually a given parameter, the nutation frequency must be selected accordingly.

The duration of the inspection period is governed by trigger photocell or cells 85 suitably positioned in the station and opening a first gate 86 which permits the passage of the output of amplifier 80 to a shift register 81. The trigger cell may also open a second gate 87 for the output of the d-c dirt film detector 52–53. The period of inspection is thus defined by the gated-open state of gate 86 and/or 87; signals in the circuit produced at times other than the inspection period are meaningless, at least in parts. As the tims of the bottles may not be uniform, a margin of safey is neded so that the inspection period must not be too long.

The respective output signals of gates 86 and 87 when representing dirt control the input of a shift register 81. For shifting shift register 81 is operated in parallel by a plurality of photocells 82 which monitor the passage of containers as between the inspection station and a place of container rejection and elimination from the conveyor 11. The shift register 81 is composed of a plurality of flip-flops and has an input and an output stage. The input stage admits signals passing through the gate 86 and/or 87. These signals stem from detector amplifiers 80 or 52 and will be at a level in a first range (for example, positive) if a dirt particle or dirt film has been detected during the inspection period as defined by operation of the gating control device 85. These signals will be at a level in a second range of levels (for example, negative) for a clean bottle. Accordingly, the input stage of the shift register 81 is either set or reset by such a signal.

As the bottle progresses the photocells 88 monitor the progression and operate the shift register 81 accordingly to shift the set or reset state of the input stage through the register and into a control flip-flop 82 to permit setting or resetting of the flip-flop, as the case may be. The flip-flop 82 is additionally operated by a timing control mechanism 83 which times actual operation of the flip-flop 82 as far as transfer of set or reset state of the output stage of register 81 is concerned.

Let it be assumed that the flip-flop is set for a signal reprsenting presence of a dirt particle in a bottle. That bottle has, in the meantime, left the inspection station, has traveled on the conveyor belt 11, and it will not enter the range of the reject station. When the bottle passes through the operating range of the reject station the flip-flop 82 is prepared for setting by timer 83. The bottle will be in a particular reject position in dependence upon the timing control 83 which monitors the relative position of a bottle in relation to the reject control mechanism. Should the bottle be rejected, the flip-floO 82 is, in fact, set and controls a reject driver 91, which in turn activates a solenoid 92. Solenoid 92 has a plunger which serves as a device that causes the bottle to be removed from the conveyor. A suitable reject device incorporating the elements 82, 83, 91 and 92 has been disclosed in my copending application.

The invention is not limited to the embodiments described above, but all changes and modifications thereof not constituting departures from the spirit and scope of the invention are intended to be covered by the following claims.

What is claimed is:

1. An inspection device for detecting foreign particles in containers, comprising:

means for illuminating a container for inspection;

optical means optically coupled to the container for defining a movable instantaneous field of view in the container to provide radiation signals modulated by relative motion between the inspection field and foreign particles therein;

radiation-sensitive means optically coupled to the optical means to be responsive to said radiation from the inspection field and providing electrical signals representative thereof;

said electrical signals being representative of the average intensity of the radiation reaching said radiation sensitive means and including superimposed components representing the frequency of said modulated motion, the presence of a foreign particle, and noise;

first circuit means connected to the radiation-sensitive means to be responsive to the component in the electrical signals representative of said modulation and providing an a-c signal representative thereof, the frequency of the a-c signal having relation to the relative motion;

second circuit means connected to the first circuit means to respond to a-c signals above a threshold level to provide an output signal representing the detection of a foreign particle if the a-c signal exceeds the threshold level; and third circuit means connected to the radiation-sensitive means and being responsive to the electrical signals as representative of the total radiation from the instantaneous inspection field and being connected to one of the first and second circuit means for controlling the amplitude relation between the a-c signals and said threshold level.

2. An inspection device as set forth in claim 1, the third circuit means being connected to the second circuit means for adjusting the threshold level in accordance with the intensity of radiation of the instantaneous inspection field and along essentially a linear characteristics.

3. A device as set forth in claim 1, the optical means including a nutator causing nutation of the instantaneous inspection field around an axis, further including a reticle for chopping the light from the instantaneous field, and finally including means coupled to the reticle for rotating the reticle to obtain said chopping of light.

4. A device as set forth in claim 1, the radiation-sensitive means being a photo electrical detector a-c coupled to the first circuit means and being d-c coupled to the third circuit means.

* * * * *